United States Patent Office 3,435,104
Patented Mar. 25, 1969

3,435,104
METHOD OF MAKING A BARIUM TITANATE BODY
Ronald J. Brandmayr, Neptune, N.J., assignor to the United States of America as represented by the Secretary of the Army
No Drawing. Filed May 3, 1966, Ser. No. 547,716
Int. Cl. C01g 23/00; C04b 35/46
U.S. Cl. 264—65    1 Claim

ABSTRACT OF THE DISCLOSURE

A ceramic dielectric powder, as for example, barium titanate is prepressed at a pressure of about 10,000 pounds per square inch and then hot pressed at a temperature of 800° C. to 850° C. at a pressure of about 30,000 pounds per square inch for about one half hour. There results a dense barium titanate body having a positive coefficient of dielectric constant in the temperature range of −70° C. to 110° C.

This invention relates in general to the art of making high dielectric constant ceramic dielectrics and in particular, to a method of making a dense barium titanate body having a positive temperature coefficient of dielectric constant in the temperature range of −70° C. to 110° C.

It is known in the art that high dielectric constant ceramic dielectrics as for example, barium titanate, can be made by hot pressing the particular ceramic dielectric powder. The resulting ceramic dielectrics however, are characterized by having a negative temperature coefficient of dielectric constant in the temperature range of −70° C. to 110° C. This obviates their use in certain desirable applications such as a temperature compensating capacitor or as a microwave ceramic resonator.

A general object of this invention is to provide a method of making a high dielectric constant ceramic dielectric that has a positive temperature coefficient of dielectric constant in the temperature range of −70° C. to 110° C. A particular object of this invention is to provide a method of making a barium titanate body having a positive temperature coefficient of dielectric constant in the temperature range of −70° C. to 110° C. and suitable for use in various applications as, for example, as a temperature compensating capacitor or as a microwave ceramic resonator.

It has now been found that the foregoing objectives can be attained by prepressing the ceramic dielectric powder, as for example, barium titanate at a pressure of about 10,000 pounds per square inch and then hot pressing the prepressed barium titanate at a temperature of 800° C. to 850° C. at a pressure of about 30,000 pounds per square inch for about one half hour.

When barium titanate powder is used as the starting material the powder has an average particle size of about 0.05 micron. Such a particle size barium titanate powder can be produced by chemical precipitation means as known in the art. For example, under U.S. Air Force Contract AF33(600)–42743, the I.T.T. Federal Laboratories Division in 1962 describes such a method of chemically precipitating barium titanate powder having an average particle size of about 0.05 micron. This material is prepressed at about 10,000 pounds per square inch in a steel die and the prepressed material then hot pressed in such a manner that no grain growth occurs in the ceramic during densification by hot pressing. Grain growth is prevented by hot pressing at a temperature of 800° C. to 850° C. at a pressure of about 30,000 pounds per square inch for about one half hour. There results a dense barium titanate body having an average grain size of about 0.05 micron in which no grain growth has occurred upon hot pressing. The dielectric constant of this material is a linear function of the temperature in the temperature range of −70° C. to 110° C. with a value of dielectric constant at 25° C. about 1600. The relative dielectric constant versus temperature curve has a slope of about 5.

The foregoing description is to be considered merely as illustrative of the invention and not in limitation thereof.

What is claimed is:

1. A method of making a dense barium titanate body having an average grain size of about 0.05 micron and a positive temperature coefficient of dielectric constant which is a linear function of the temperature in the temperature range of −70° C. to 110° C. with a magnitude of dielectric constant of about 1600 at 25° C., said method comprising prepressing barium titanate powder having an average particle size of about 0.05 micron at a pressure of about 10,000 pounds per square inch and then hot pressing the prepressed barium titanate at a temperature of 800° C. to 850° C. at a pressure of about 30,000 pounds per square inch for about one half hour.

References Cited

UNITED STATES PATENTS

| | | | |
|---|---|---|---|
| 2,758,911 | 8/1956 | Lynd et al. | 23—51 |
| 2,966,420 | 12/1960 | Prokopowicz et al. | 106—39 |
| 2,990,602 | 7/1961 | Brandmayr et al. | 106—39 |
| 3,178,307 | 4/1965 | Carnall et al. | 23—51 |
| 3,231,328 | 1/1966 | Pechini | 23—51 |

OTHER REFERENCES

Ceramic Bulletin, vol. 45, No. 5 (1966), pp. 541–544, "Dielectric Titanate Body Improvement."

DONALD J. ARNOLD, Primary Examiner.

U.S. Cl. X.R.

23—51; 106—39; 252—520; 264—66, 104